United States Patent
Singal et al.

(10) Patent No.: US 6,859,840 B2
(45) Date of Patent: Feb. 22, 2005

(54) PREFIX CACHING FOR MEDIA OBJECTS

(75) Inventors: Sanjay S. Singal, Mountain View, CA (US); Satish N. Menon, Sunnyvale, CA (US)

(73) Assignee: Kasenna, Inc., Mountain View, CA (US)

( * ) Notice: Subject to any disclaimer, the term of this patent is extended or adjusted under 35 U.S.C. 154(b) by 600 days.

(21) Appl. No.: 09/774,204

(22) Filed: Jan. 29, 2001

(65) Prior Publication Data

US 2002/0103928 A1 Aug. 1, 2002

(51) Int. Cl.$^7$ ............... G06F 15/16; G06F 15/173
(52) U.S. Cl. ............... 709/232; 709/217; 709/236
(58) Field of Search ............... 709/201, 202, 709/203, 217, 219, 225, 206, 207, 231, 238, 232, 245, 236, 247, 249

(56) References Cited

U.S. PATENT DOCUMENTS

| | | | |
|---|---|---|---|
| 5,568,181 A | | 10/1996 | Greenwood et al. |
| 6,094,706 A | * | 7/2000 | Factor et al. ............... 711/113 |
| 6,131,095 A | * | 10/2000 | Low et al. ............... 707/10 |
| 6,343,298 B1 | * | 1/2002 | Savchenko et al. ............... 707/104.1 |
| 2002/0010798 A1 | * | 1/2002 | Ben-Shaul et al. ............... 709/247 |

OTHER PUBLICATIONS

Sen, et al., "Proxy Prefix Caching For Multimedia Streams," *IEEE*, 1999.
Sen, S., et al., "Proxy Prefix Caching for Multimedia Streams", *IEEE*, 1999, 0–7803–5420–6/99.

* cited by examiner

Primary Examiner—Paul H. Kang
(74) Attorney, Agent, or Firm—Dorsey & Whitney LLP

(57) ABSTRACT

A method, system, and computer readable medium for delivering media object to a user over a computer network. Media object is divided into first portions and remaining portions, and the first portions are stored on edge server computers in communication with client computers. Upon receiving a request for delivery from a user, the edge server computer transmits the first portion of the media object to the client computer. The edge server computer then requests delivery of the remaining portion of the media object from the origin server computer. Upon receipt of the remaining portion of the media object from the origin server computer, the edge server computer transmits the remaining portion of the media object to the user such that delivery of both portions of the media object to the client computer is continuous and uninterrupted.

18 Claims, 4 Drawing Sheets

PREFIX CACHING FOR MEDIA OBJECTS

FIELD OF THE INVENTION

The present invention relates broadly to computer networks and streaming media object delivered over computer networks. Specifically, the present invention relates to caching portions of a video stream at various locations on a computer network, transmitting remaining portions once the cached segment is requested by a user, and delivering video data according to strict timing requirements.

BACKGROUND OF THE INVENTION

Broadband Internet network infrastructure is developing at rates that exceed the most aggressive analyst predictions. In the consumer market sector, telecommunications, cable and wireless companies have accelerated deployment of broadband capability to the home with xDSL, cable modem or wireless last mile rollouts. In the corporate market sector, broadband infrastructure is already available for desktop computing applications.

Broadband provides a foundation for the use of good quality IP video in Internet applications. Traditionally limited to Intranets or private networks, broadband Internet connectivity is paving the way for video-based applications such as Internet advertising with video, rich media on web pages, video-assisted e-commerce (video catalogs, travel, etc.), event webcasting, personalized information on demand (news, sports, medicine, lectures, movies, etc.), personal video exchanges, and training and corporate communications.

Compared to the low frame-rate, small sized videos traditionally found on the Internet and delivered on narrowband connections, advances in compression technologies have made reasonable quality video possible at connection rates of 300 Kbits/sec (Kbps) or higher. News stories and lectures with very little motion or action can be sent at lower bit rates of approximately 100 Kbps to 200 Kbps. Video with a lot of movement, like a fashion show, needs a higher bit rate to capture the motion and detail of the scene. For a content provider considering Internet distribution, 300 Kbps could be considered acceptable, and 1 to 1.5 Mbps, excellent. Video catalogues, advertisements, and other commerce-related uses of video require that the product be presented at the highest quality levels possible. Broadband rates of 1.5 Mbps and higher afford 30 frames per second (fps) video with CD quality audio. Content with a lot of movement, such as auto racing, needs even higher bit rate, as high as 3 to 4 Mbps.

As Broadband connections proliferate, demand for better performance has fostered an industry focused on speeding up the delivery of Internet content. The majority of these solutions have centered on smaller objects such as text and images. Due to its sheer size, video is one of the most difficult data types to manage on the Internet. A five-minute video clip, encoded and compressed at 1.5 Mbs is 56 Megabytes in size. Video also has strict timing requirements. A frame arriving past its presentation time ($\frac{1}{30}$ sec in the case of a 30 fps video) is useless and the user experiences jerky playback. Given these stringent requirements, delivering quality video over broadband is a challenging problem.

While deployment of the broadband infrastructure is an important step in enabling streaming video over the Internet, upgrades to connectivity and bandwidth alone do not assure the delivery of quality video to large audiences with minimal start-up latencies. When video is streamed to the end user via the Internet backbone, video quality is often impacted by problems. When the source of the video is not close enough to the end user, packet losses can severely compromise video quality. Packet losses result from congestion buffering introduced by network switches and routers between the video source and the end user. Current bandwidth costs (satellite and terrestrial) make it impractical to stream high-quality video from a server to the end user on a point-to-point basis.

Existing solutions geared towards improving the performance of accessing web pages containing rich media (typically images) are increasingly being used to address the problems with streaming video on the Internet. Currently, there are two classes of solutions that have been employed for improving performance on the Internet: content delivery networks and caching solutions.

Content Delivery Networks

Most content delivery networks employ architecture commonly referred to as distributed content services (DCS). Under DCS, portions of web pages containing large amounts of content such as images are replicated ("pushed") on a number of edge servers deployed in last-mile service provider locations close to the edges of the network, as shown in FIG. 1. When a user accesses such a web page, the edge server closer to the user is directed to serve the replicated content to the user. This solution avoids moving large files through the network backbone for frequently used content. Avoiding the backbone can improve performance (since there are fewer hops between a strategically placed edge server and the client) and is a more cost-effective and scalable solution. Content delivery networks generally use private satellite and terrestrial networks to connect the originating server to the edge servers. This solution has been widely deployed to improve the delivery of small media types such as static images and streaming audio on web pages.

Caching Solutions

In the caching solutions approaches, when a user first accesses a web page containing static content (images, audio, video), content is served directly ("pushed") from the origin server and is subsequently cached by a caching server. Caching servers are placed at strategic points in a network (typically an ISP network) that are closer to the end users. On subsequent access of the same pages, the cached content is served directly to the end user (FIG. 2). Caching systems consist of specialized equipment at the service provider locations that monitor URL requests for web objects. Serving content from cached server can reduce Internet backbone traffic up to 50% thus reducing bandwidth costs. Serving content from a cache closer to the end user also improves performance for the reasons outlined in the first approach.

The current methods for content delivery and caching are not optimal for the delivery of high-quality video. Current content delivery networks ensure guaranteed response times by storing all of the response-time sensitive data at the edges of the network. Users ensure response times by paying for storage costs. The main assumption here is that storage costs are significantly lower than bandwidth costs associated with transporting data over the backbone. The sheer sizes of high-quality, full-frame rate video on broadband networks require a reexamination of the storage vs. bandwidth issue. To illustrate this issue, consider emerging applications of broadband video on the Internet:

Delivery of Personalized Information on Demand

Customized delivery of information rich in video content (new, sports, entertainment, personal health etc.) is a growing application segment on the broadband Internet. A five-minute video segment at 1.0 Mbps amounts to 37.5 megabytes. One such channel of video, which is a 24-hour segment split into 5 minute segments amount to about 10 gigabytes of storage. A hundred such channels amount to 1 terabyte. Such media stored on 1000 edge servers amount to 1 petabyte of storage for one day's worth of video.

Content Delivery Network Approach Issues

From hardware cost perspective, it is impractical to store all of the data inside the edge networks. Additionally, floor space is at a premium at central offices and cable head-ends where the servers and storage need to be deployed. An intelligent placement of data based on measured and anticipated usage is certainly more practical. Storage issues involve more than just disk space. An 18-gigabyte disk may be large enough to hold approximately two days of one channel at an edge server. However, at current disk bandwidth rates (approximately 50 Mbps), a disk may have capacity to serve 50 users simultaneously. To serve more users, the data need to be replicated appropriately, adding to the storage costs significantly.

Caching Approach Issues

Networks that use pure caching solutions also suffer from problems due to the sheer size of the objects they are required to cache. If a media object is not found in the cache, it takes a certain amount of time before the requested media object is found and the cache is loaded. To most users, this latency is unacceptable. Once cached, the system behaves as a content delivery system described above. However, for any reasonable size cache, the number of objects that can be cached is fairly small leading to high rate of cache misses.

Thus, an optimal solution for streaming video over the Internet is greatly needed. The current popular solutions have been designed for delivering static images and streaming audio over the Internet and are unable to meet streaming video requirements.

SUMMARY OF THE INVENTION

The present invention solves the problems described above by providing high quality media content distribution over global computer networks based on admission control in a prefix caching system. In an embodiment of the present invention, a relatively small portion of a media object (prefix) is stored at a server located proximate to a user. When the user requests the media object to be played, the prefix is streamed to the user while the remaining portion of the media object is fetched as quickly as possible from another location and delivered to the user while maintaining the timing requirements of audio and/or video, thus without interrupting or delaying the delivery to the user. This method eliminates the latency experienced in prior caching solutions.

When a user makes a URL selection for a media object on an edge server, the information stored on the server corresponding to the URL is examined to determine the status of the corresponding media object is in the edge server's cache. The status of a media object may be as follows: A) The object is fully contained in the cache. In this case no further action is needed and the media object is streamed to the user. B) The prefix of the media object is in the cache. In this case, a request to fetch the rest of the media is made and the media prefix is streamed to the user, and the remaining portion of the media object is streamed after the prefix is streamed. C) no part of the media object is available stored on the edge server. In this case, the user is made to wait until a sufficient amount of the media object is fetched before the streaming begins.

These and other attendant advantages of the present invention will be readily understood by one skilled in the art upon reading the following detailed description in view of the figures, in which:

DETAILED DESCRIPTION

Figure 1:
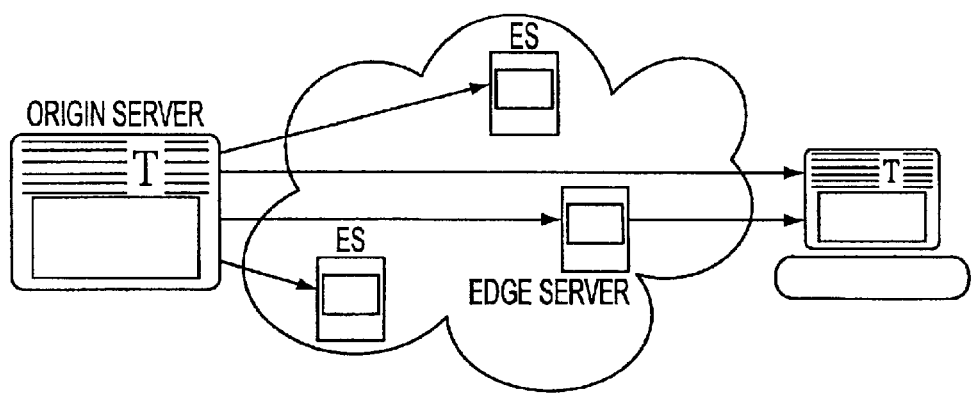
FIG. 1 is an illustration in block diagram form of a prior art system employing an origin server and a network of edge servers.
Figure 2:
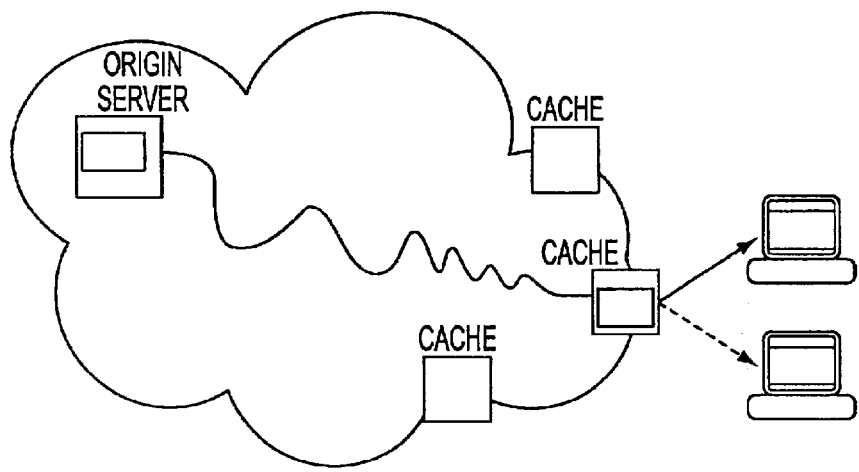
FIG. 2 is an illustration in block diagram form of a prior art system employing a network of caching servers.

According to the present invention, a media object is audio and/or video content that is divided into a beginning portion (prefix), and a remaining portion (suffix). A prefix can be stored (cached) on an edge server and streamed to a user while the suffix is being fetched from an origin server. Prefix caching for streaming media objects is more complex than caching all other data types. A locally stored prefix can aid in the presentation of the stream to the end user with minimal startup latencies. However, because of the strict timing requirements of audio and video, the content transfer system must ensure that after the prefix has been streamed to the user, enough data is available for the streaming to continue uninterrupted. Otherwise, the user will experience jerky playback for audio and video.

A critical issue is the amount of data in a prefix that is stored on an edge server. Prior to starting the stream from the prefix cache available on disk, the following requirements must be met:

1. The size of the prefix is large enough to ensure that given adequate resources, the streaming can continue uninterrupted, once started.
2. It is possible to reserve resources (network bandwidth, disk bandwidth, CPU, memory, etc.) so that once started, the resources will continue to be available to service the stream uninterrupted.

These requirements are related. The larger the network bandwidth available, the smaller the prefix that needs to be cached. For example, if there is 10 Mbps available bandwidth between an origin server and an edge server and a 5 minute video clip at 1 Mbps (constant bit rate), the prefix only needs to be large enough to hide the round-trip messaging latency as well as latencies involved in setting up the stream between the origin server and the edge server. The rest of the data can be fetched as fast as the network allows (in this case, 10 times faster than the rate at which the data would be consumed).

If the available bandwidth between the origin server and edge server drops down to one Mbps due to multiple transfers in progress, there is very little tolerance for error. Larger prefixes in this case provide a cushion to compensate for spikes in available bandwidth. If the available bandwidth for fetching the suffix falls below the consumption rate (or encoded rate of the media object), possibility for starvation exists. In this case, the system cannot start the streaming right away; it needs to ensure that given the available bandwidth, there is enough cached data so that starvation will not occur before the media object is completely played back. If there is insufficient cached data, the edge server will first fetch more data into the prefix cache so that this constraint is satisfied prior to the start of streaming.

Admission control is performed to ensure that the prefix cache is large enough under the current network conditions (as measured by the two ends—the origin server and the edge server). The basic operation of the admission control system is as follows: T=Total size of the media object (video and/or audio file). P=Size of the prefix currently available at an edge. B=bitrate of the asset (for variable bit rate asset, this could be the average bitrate). The duration of the media is T/B. The duration of the prefix is P/B. The transfer rate R required by is given by: (T−P)/(T/B). Thus the admission control system needs to guarantee that the available bandwidth at that instant exceeds R. If R were less than the current network capacity, then starvation would occur. Since T and B are constant, starvation is avoided by adjusting P. The present invention provides information on what the value of P should be that would prevent starvation. The value of P is adjusted as necessary to compensate for spikes in network bandwidth.

The present invention provides services to ensure that once admitted, resources are available and locked down to ensure that starvation will not occur. The storage manager provides accounting services for disk bandwidth. Disk bandwidth resource management is required to ensure that at the origin server as well as the edge server, data can be read and written according to the needs of the admission control system. The connection manager ensures that the network interfaces have the sufficient bandwidth for streaming as well as transfers to caches by providing accounting at the network interface level. However, this accounting may be inaccurate in a public network where traffic in the network cannot be completely measured by any two end points, if the end points are not point-to-point connections. This is not a problem in managed networks, where the network activity in the system can be completely accounted for.

Figure 3:
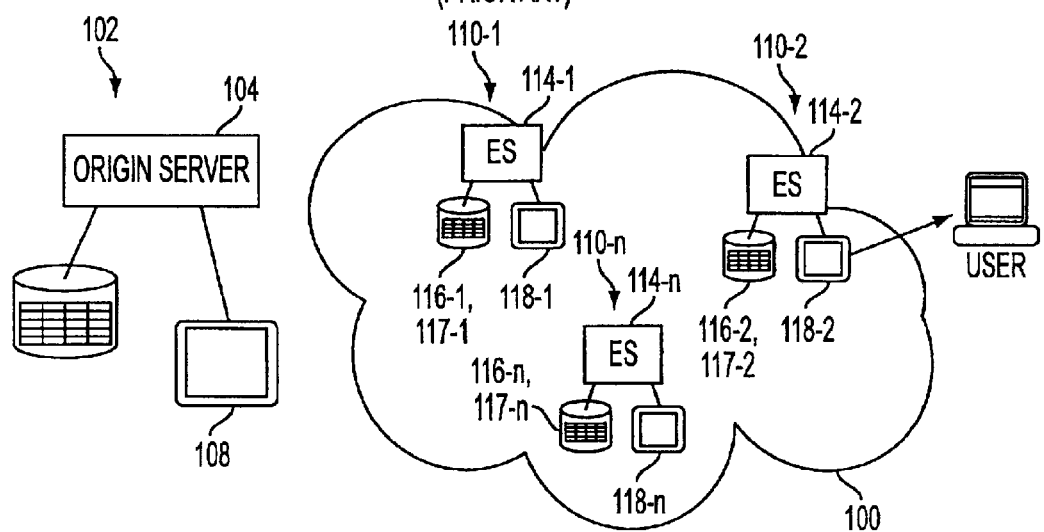
FIG. 3 is an illustration in block diagram form of the system of the present invention as deployed in a global computer network.

Directing attention to FIG. 3, an embodiment of the present invention incorporates a computer network 100 having a client server or peer to peer architecture. Origin subsystem 102 includes an origin server 104, and media store module 108. The origin subsystem 102 is connected to edge subsystems 110-1, 110-2, . . . , 110-n (where n is a desirable number of computers), via computer network 100, and provides media objects to the edge subsystems 110 on demand. Each edge subsystem 110 includes an edge server 114 having a connection manager 116 and storage manager 117. Prefix cache 118, as well as other storage for media objects, is also included in edge subsystem 110. The edge subsystems 110 in turn delivers the media objects to users at remote locations. Media objects are also stored on the origin subsystem 102's media content store. The prefix is distributed to the prefix cache 118 a priori, thus avoiding initial latencies involved in copying media objects from an origin server to an edge server. Prefix size can be determined manually or automatically based on network capacity and/or other conditions. The prefix caching distribution of the present invention involves distribution of prefixes to the edge servers 114 based on characteristics such as anticipated demand, measured usage and the type of connection between the origin server 104 and the edge server 114. For example, a larger prefix may be pushed to the edge servers 114 based on anticipated demand and service level agreements. If a hit occurs for media object having a prefix stored at the edge server, streaming can begin upon demand, while the suffix is fetched in parallel (pipelined) from the origin server 104 and cached at the edge server 114. This reduces the a priori storage space requirements while eliminating latencies of initial access. When cache is recycled, prefixes are retained.

Broadband Media System

Figure 4:
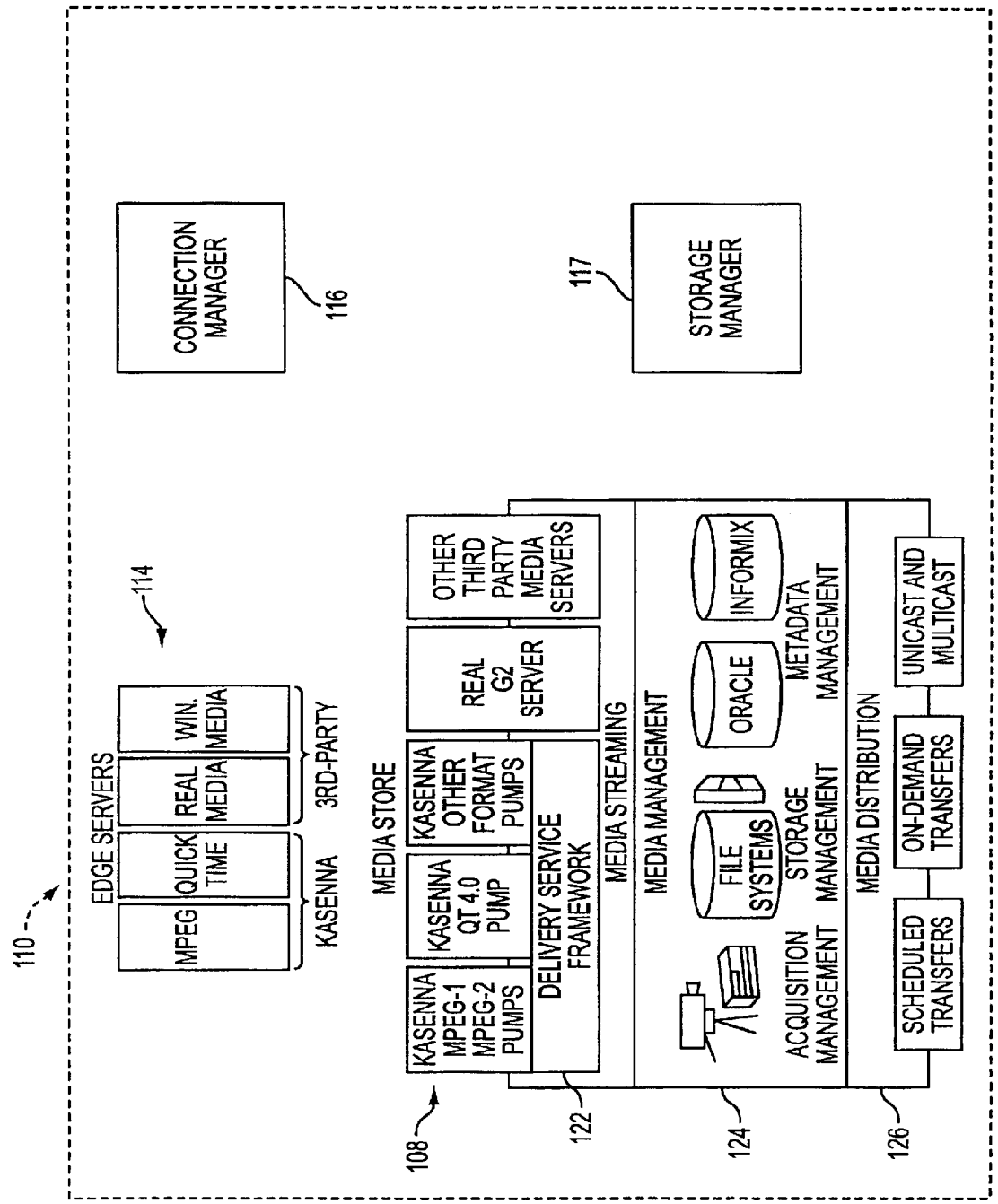
FIG. 4 is an illustration in block diagram form of the major components included in the system of the present invention.

To build the media content delivery network of the present invention, a service provider can deploy the system in a centrally hosted, edge-served distributed architecture. FIG. 4 illustrates the components utilized in connection with origin subsystem 102 and edge subsystem 110. Content store module 108 provides for acquisition, hosting and distribution of media. Media distribution formats are open and published, enabling content from a hosted system to be injected into content delivery networks. The content store module 108 includes a media streaming module 122. Media streaming module 122 can include data pumps for MPEG-1 (system streams), MPEG-2 (transport streams), MP3, QuickTime and H.263. Real Server G2 can also be used, providing streaming for Real Audio and Real Media. Windows Media Server can also be used to provide ASF streaming, running on NT servers.

The media management module 124 performs acquisition management over content, stores the content in file systems and manages storage on the server. The media distribution module 126 manages transfer of content for scheduled transfers, on demand transfers, as well as unicast and multicast transfers.

Currently available content delivery networks are optimized for small web objects. Serving broadband media to millions of users requires solutions geared specifically for addressing the technical demands imposed by media objects. The system of the present invention provides an optimal solution for media delivery where storage capacity available at the network core can be efficiently utilized as backing store for edge servers 114.

The system of the present invention is format-independent and provides streaming for a variety of formats that cover the range of narrowband to broadband media. As discussed above, the system provides streaming of formats such as H.263, MPEG-1, MP3, MPEG-2, QuickTime, RealAudio and RealVideo formats, thus allowing more than one representation of a media object associated with a URL. For example, a URL representing a video stream may be backed by a QuickTime video encoded at 128 Kbps as well as an MPEG-1 video encoded at 1.5 Mbps.

Figure 5:
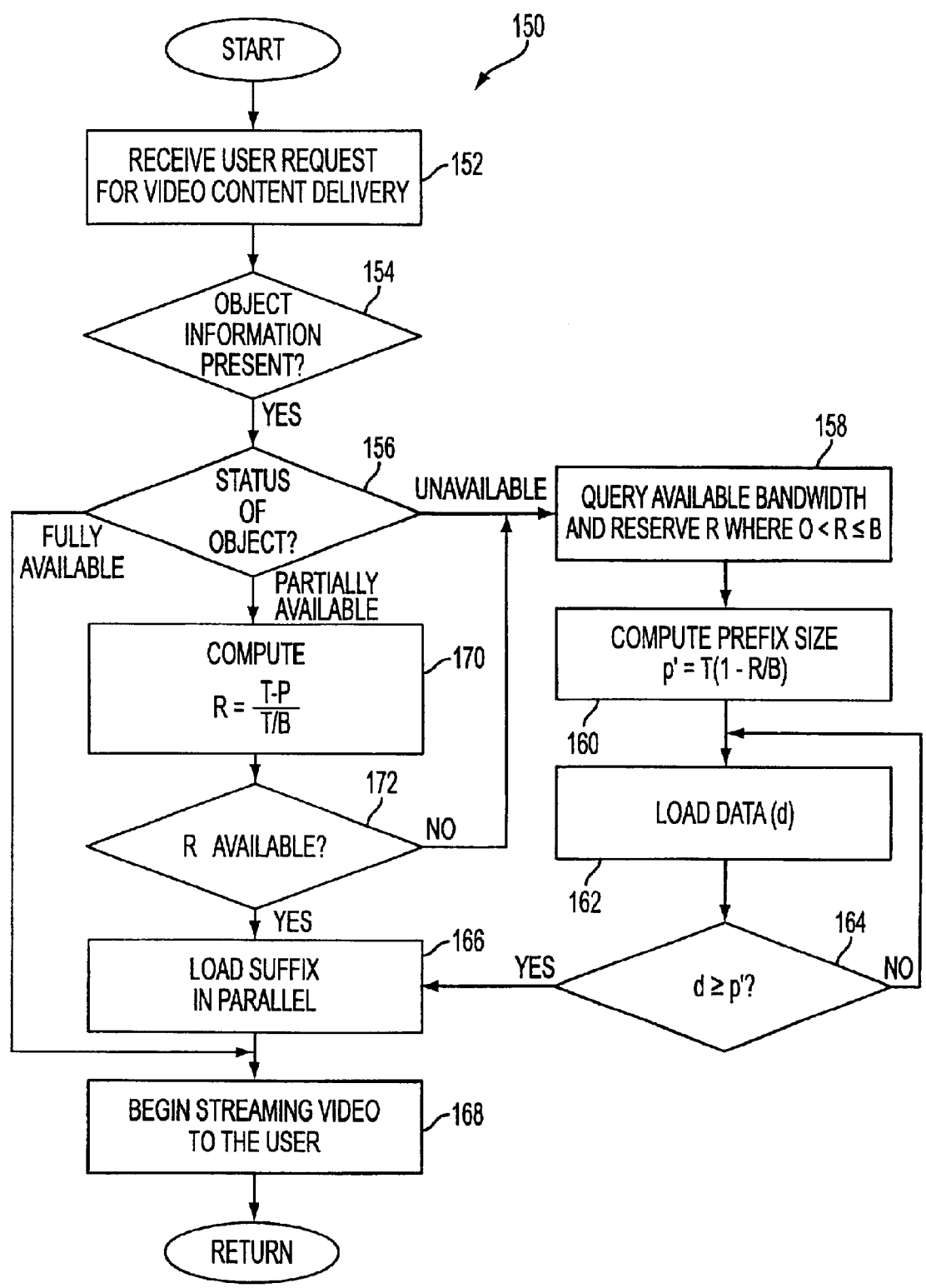
FIG. 5 is a flowchart illustrating the logical sequence of steps executed to perform the method of the present invention.
Figure 6:
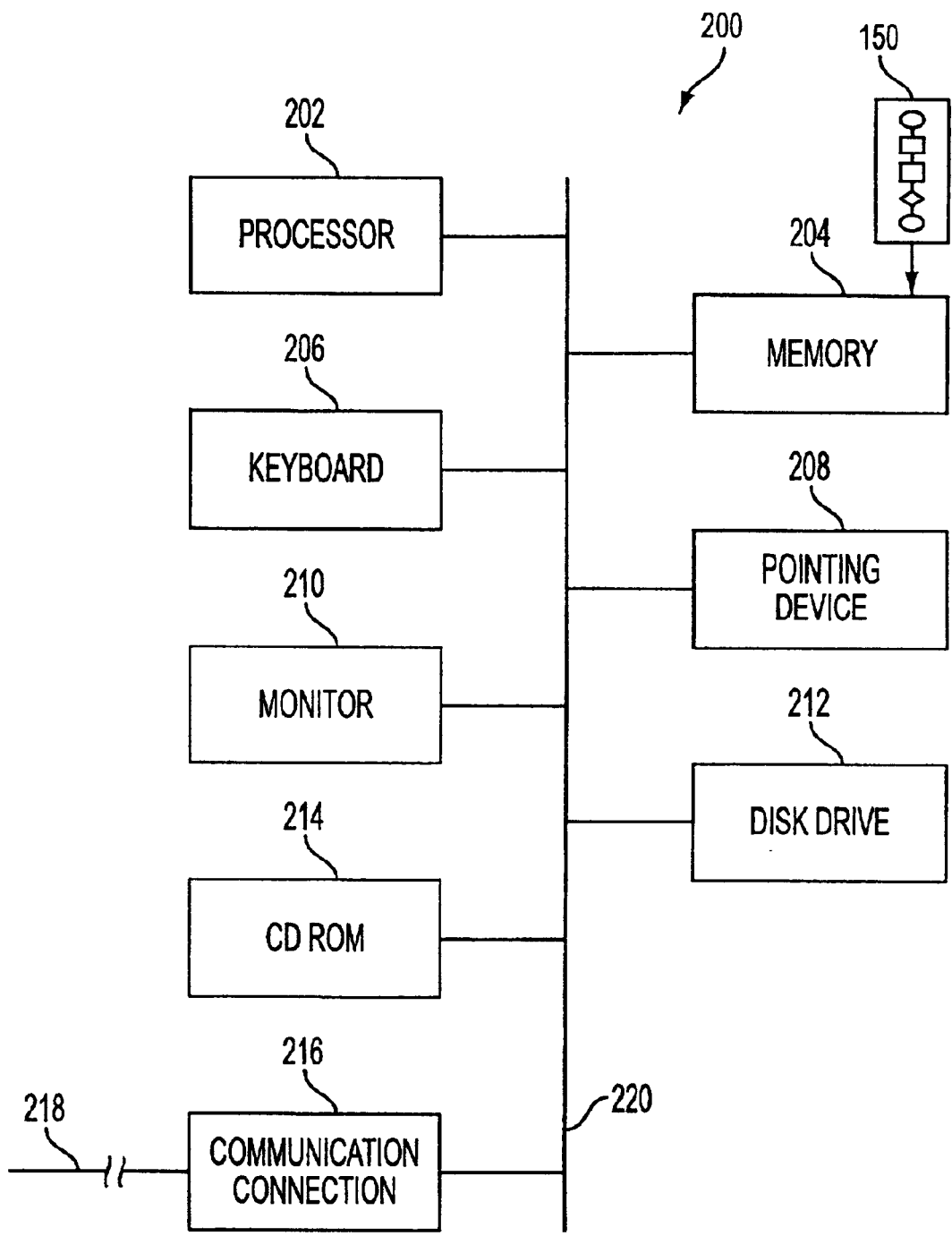
FIG. 6 is an illustration in block diagram form of the major components of a computer as used in conjunction with the system of the present invention.

FIG. 5 illustrates the logical sequence of operative steps that carry out the method of the present invention. These steps may be embodied in a computer program 150. Beginning at step 152, a user connected to an edge server 114 requests delivery of a media object associated with a URL. This request can take the form of a URL for the desired media object being sent from the user to the edge server 114. At decision step 154, the edge server 114 searches the prefix cache 118 to see if object information matching the media object requested by the user is stored. If there is object information, control proceeds to decision step 156, where the object information is evaluated to determine the status of the requested media object. Status of a media object can be fully available, partially available, or unavailable. If the media object is unavailable, control proceeds to step 158 where available bandwidth is examined and a transfer rate R is reserved where R is greater than zero and less than or equal to the available bandwidth. Continuing to step 160, a new prefix size P' is calculated P=T(1−R/B). Continuing to step 162, data (d) is loaded. If d is less than the new prefix size p' (decision step 164), then control returns to step 162 and more data is loaded. Continuing to step 166, the media suffix is loaded in parallel, and the media object is streamed to the user (step 168). While steps 166 and 168 are shown in a sequential order, streaming in step 168 may also begin before or concurrently with step 166. Returning to step 156, if the status of the media object is evaluated to be fully available, control proceeds directly to step 168. However, if the status of the media object is evaluated as partially available, control proceeds to step 170, where the rate R is computed as T−P divided by T/B. Continuing to decision step 172, admission control is performed by examining whether sufficient bandwidth R is available. If sufficient bandwidth is available, control proceeds to step 166 where the suffix is loaded in parallel and the media object is streamed to the user at step 168. However, if sufficient bandwidth is not available, control proceeds to steps 158 through 168 as described above.

If transfer rates are slow, due to high network traffic, the amount of data that must be cached before streaming is larger than the amount required if network conditions are optimal; in this manner, strict timing requirements of streaming media are met and jerky playback and other problems associated with timing are avoided.

6 illustrates in high level block diagram form the major hardware components of a computer that may be used to implement the origin subsystem 102 and edge subsystem of the present invention. Computer 200 incorporates a processor 202 utilizing a central processing unit (CPU) and supporting integrated circuitry. In the preferred embodiment, work stations such as Sun Ultra computers available from Sun Microsystems can be used as computer 200. Memory 204 may include RAM and NVRAM such as flash memory, to facilitate prefix cache 118 and storage of software modules executed by processor 202, such as computer program 150. Also included in computer 200 are keyboard 206, pointing device 208, and monitor 210, which allow a user to interact with computer 200 during execution of software programs. Mass storage devices such as disk drive 212 and CD ROM 214 may also be in computer 200 to provide storage for computer programs, media objects and associated files. Memory 204, disk drive 212, and CD ROM 214 may be used to implement the content store module 108, and prefix cache 118. Computer 200 may communicate with other computers via communication connection 216 and communication line 218 to allow the computer 200 to be operated remotely, or utilize files stored at different locations. The components described above may be operatively connected by a communications bus 220.

Having disclosed exemplary embodiments and the best mode, modifications and variations may be made to the disclosed embodiments while remaining within the scope of the present invention as defined by the following claims.

What is claimed is:

1. A method for delivering media objects across a communication network comprising multiple edge server computers controllably connected to at least one client computer and at least one origin server computer, the method comprising:

storing said media object on said origin server computer;

storing a prefix on at least one edge server computer, said prefix comprising a beginning portion of said media object, and a size of the prefix is determined, at least in part, by anticipated demand for said media object;

transmitting said prefix from said edge server computer to said at least one client computer; and transmitting to said at least one client computer said media object subsequent to said prefix such that transmission of said prefix and said media object is delivered to said at least one client computer without interruption.

2. The method of claim 1, wherein said media object is transmitted from said origin server computer to said edge server computer in parallel.

3. The method of claim 1, wherein said prefix is distributed to said edge server computer based on anticipated demand.

4. The method of claim 1, wherein said prefix is distributed to said edge server computer based on measured usage.

5. The method of claim 1, wherein said prefix is distributed to said edge server computer based on a connection between said origin server computer and said edge server computer.

6. The method of claim 1, wherein said media object is referenced by a URL.

7. The method of claim 6, wherein said user requests delivery of said media object by selecting said URL.

8. A method according to claim 1, further comprising:

reserving an amount of bandwidth on a connection between the origin server and the edge server, the amount of bandwidth sufficient to allow transfer of said media object to said edge server such that the media object is viewed by the client computer without interruption.

9. A method according to claim 1, further comprising:

reserving an amount of disk bandwidth on a device storing the media object, the amount of disk bandwidth sufficient to allow transfer of said media object to said edge server such that the media object is received by the client computer without interruption.

10. A computer program product for delivering media objects across a communication network comprising multiple edge server computers controllably connected to client computers and at least one origin server computer, said computer program product, when executed on a computer, performing:

storing said media object on said origin server computer;

transmitting a prefix of said media object to said at least one edge server computer, said prefix containing a beginning portion of said media object, and a size of the prefix is determined, at least in part, by anticipated demand for said media object;

receiving a delivery request from said edge server computer for transmission of the remaining portion of said media object associated with said prefix; and transmitting said remaining portion to said edge server computer in response to said delivery request, said remaining portion delivered subsequent to said prefix without interruption or delay.

11. A computer program product for delivering media objects across a communication network comprising multiple edge server computers controllably connected to client computers and at least one origin server computer, the computer program product, when executed on a computer, performing:

storing a prefix, said prefix comprising a beginning portion of said media object, and a size of the prefix is determined, at least in part, by anticipated demand for said media object;

receiving a request from said client computer for delivery of said media object;

transmitting said prefix to said client computer in response to said delivery request;

receiving remaining portion of said media object associated with said prefix; and transmit said media object to said client computer such that delivery of the prefix is followed by delivery of the media object without interruption or delay.

12. A computer system for delivering media objects to a client computer, said computer system comprising:

at least one origin server computer, said origin server computer storing at least one media object;

at least one edge server computer, said edge server computer storing a prefix of said media object, said prefix containing a beginning portion of said media object, said edge server computer in communication with said origin server computer, said client computer issuing to said edge server computer a request for delivery of said media object, and a size of the prefix is determined, at least in part, by anticipated demand for said media object; said origin computer transmitting said media object associated with said first portion to said edge server computer, said edge server computer subsequently transmitting said media object associated with said first portion to said client computer such that delivery of the first portion and said subsequently transmitted media object is continuous and uninterrupted.

13. The computer system of claim 12, wherein said origin server computer contains said media object in multiple file formats.

14. The computer system of claim 12, further including a media streaming module.

15. The computer system of claim 12, further including a media management module.

16. The computer system of claim 12, further including a media distribution module.

17. The computer system of claim 14, wherein said media streaming module, media management module, and media distribution module are included in said origin server computer.

18. The computer system of claim 17, wherein said media streaming module, media management module, and media distribution module are included in said edge server computer.

* * * * *